United States Patent
Lee et al.

(10) Patent No.: US 10,168,892 B2
(45) Date of Patent: Jan. 1, 2019

(54) DEVICE FOR HANDLING TOUCH INPUT AND METHOD THEREOF

(71) Applicant: Samsung Electronics Co., Ltd., Gyeonggi-do (KR)

(72) Inventors: Sang Hyun Lee, Gyeonggi-do (KR); Woo Kwang Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/860,180

(22) Filed: Sep. 21, 2015

(65) Prior Publication Data
US 2016/0085405 A1    Mar. 24, 2016

(30) Foreign Application Priority Data
Sep. 19, 2014    (KR) .................... 10-2014-0125312

(51) Int. Cl.
*G06F 3/0488*    (2013.01)
*G06F 3/0486*    (2013.01)
(Continued)

(52) U.S. Cl.
CPC .......... *G06F 3/0488* (2013.01); *G06F 3/0412* (2013.01); *G06F 3/0486* (2013.01);
(Continued)

(58) Field of Classification Search
CPC .............. G06F 3/0488; G06F 3/04817; G06F 3/04842; G06F 3/0412; G06F 3/0486;
(Continued)

(56) References Cited

U.S. PATENT DOCUMENTS 4,550,221 A * 10/1985 Mabusth ............. G06F 3/03547
178/18.06
5,570,113 A * 10/1996 Zetts ................... G06F 3/04883
345/156
(Continued)

FOREIGN PATENT DOCUMENTS

| KR | 10-2009-0034662 | 4/2009 |
| KR | 10-2012-0001476 | 1/2012 |

(Continued)

OTHER PUBLICATIONS

International Search Report dated Jan. 6, 2016 issued in counterpart application No. PCT/KR2015/009829, 11 pages.
(Continued)

*Primary Examiner* — Mihir K Rayan
(74) *Attorney, Agent, or Firm* — The Farrell Law Firm, P.C.

(57) ABSTRACT

An electronic device and method in which an electronic device handles a hovering operation are provided. The electronic device includes a display including a first area at which an object is displayed and a second area adjacent to the first area, and a touch module configured to recognize a user input selecting the object and an operation in which the user input is hovering, wherein the touch module is further configured to determine that the selection of the object is maintained if the user input is hovering above a specific area. The method includes recognizing a user input selecting an object; recognizing that the hovering operation is performed above a specific area; and determining that a selection of the object is maintained, wherein a display of the electronic device comprises a first area at which the object is displayed and a second area adjacent to the first area.

18 Claims, 12 Drawing Sheets

(51) Int. Cl.
*G06F 3/0484* (2013.01)
*G06F 3/0481* (2013.01)
*G06F 3/041* (2006.01)

(52) U.S. Cl.
CPC ...... *G06F 3/04817* (2013.01); *G06F 3/04842* (2013.01); *G06F 3/04883* (2013.01); *G06F 3/04886* (2013.01); *G06F 2203/04101* (2013.01); *G06F 2203/04803* (2013.01)

(58) Field of Classification Search
CPC ............. G06F 3/04883; G06F 3/04886; G06F 2203/04101; G06F 2203/04803
See application file for complete search history.

(56) References Cited

U.S. PATENT DOCUMENTS

| | | | |
|---|---|---|---|
| 6,331,840 B1 * | 12/2001 | Nielson | G06F 3/0488 345/1.1 |
| 6,459,424 B1 | 10/2002 | Resman | |
| 8,704,781 B2 * | 4/2014 | Kii | G06F 3/0488 178/18.03 |
| 8,723,824 B2 | 5/2014 | Myers et al. | |
| 8,976,141 B2 | 3/2015 | Myers et al. | |
| 9,043,732 B2 | 5/2015 | Nurmi | |
| 9,886,131 B2 | 2/2018 | Baker et al. | |
| 2001/0030667 A1 * | 10/2001 | Kelts | G06F 3/0481 715/854 |
| 2006/0278444 A1 * | 12/2006 | Binstead | G06F 3/044 178/18.06 |
| 2007/0229469 A1 * | 10/2007 | Seguine | G06F 3/011 345/173 |
| 2009/0237371 A1 * | 9/2009 | Kim | G06F 3/0485 345/173 |
| 2010/0023895 A1 * | 1/2010 | Benko | G06F 3/041 715/863 |
| 2010/0105428 A1 * | 4/2010 | Kim | G03B 21/14 455/556.1 |
| 2010/0117975 A1 * | 5/2010 | Cho | G06F 1/1626 345/173 |
| 2010/0245246 A1 * | 9/2010 | Rosenfeld | G06F 3/03543 345/163 |
| 2010/0245275 A1 * | 9/2010 | Tanaka | G06F 1/1624 345/173 |
| 2010/0299638 A1 | 11/2010 | Choi | |
| 2011/0151935 A1 | 6/2011 | Oksman et al. | |
| 2011/0234491 A1 | 9/2011 | Nurmi | |
| 2011/0316790 A1 | 12/2011 | Ollila et al. | |
| 2011/0319138 A1 | 12/2011 | Noh | |
| 2012/0038586 A1 | 2/2012 | Han et al. | |
| 2012/0066591 A1 * | 3/2012 | Hackwell | G06F 3/03547 715/702 |
| 2012/0084692 A1 | 4/2012 | Bae | |
| 2012/0102436 A1 | 4/2012 | Nurmi | |
| 2012/0274575 A1 * | 11/2012 | Solomon | G06F 1/1601 345/173 |
| 2013/0076649 A1 | 6/2013 | Myers et al. | |
| 2013/0178248 A1 | 7/2013 | Kim | |
| 2013/0300697 A1 * | 11/2013 | Kim | G06F 1/1626 345/173 |
| 2014/0028614 A1 | 1/2014 | Bae et al. | |
| 2014/0053079 A1 | 2/2014 | Ollila et al. | |
| 2014/0085259 A1 | 3/2014 | Lee | |
| 2014/0118281 A1 * | 5/2014 | Baker | G06F 3/0418 345/173 |
| 2014/0132553 A1 * | 5/2014 | Park | G06F 3/044 345/174 |
| 2014/0152623 A1 | 6/2014 | Lee et al. | |
| 2014/0240260 A1 * | 8/2014 | Park | G06F 3/0488 345/173 |
| 2014/0240289 A1 | 8/2014 | Myers et al. | |
| 2014/0282279 A1 * | 9/2014 | Woolley | G06F 3/04883 715/863 |
| 2015/0130767 A1 | 5/2015 | Myers et al. | |
| 2015/0227227 A1 | 8/2015 | Myers et al. | |
| 2015/0242006 A1 | 8/2015 | Kim et al. | |
| 2016/0117052 A1 | 4/2016 | Baker et al. | |

FOREIGN PATENT DOCUMENTS

| | | |
|---|---|---|
| KR | 10-2012-0033516 | 4/2012 |
| KR | 10-2013-0081617 | 7/2013 |
| KR | 10-2013-0108604 | 10/2013 |
| KR | 10-2013-0127050 | 11/2013 |
| KR | 10-2014-0016098 | 2/2014 |
| KR | 10-2014-0039924 | 4/2014 |
| KR | 10-2014-0070150 | 6/2014 |

OTHER PUBLICATIONS

European Search Report dated Feb. 4, 2016 issued in counterpart application No. 15186023.6-1972, 7 pages.
European Search Report dated Jul. 18, 2018 issued in counterpart application No. 15186023.6-1216, 47 pages.

* cited by examiner

_US 10,168,892 B2_

DEVICE FOR HANDLING TOUCH INPUT AND METHOD THEREOF

PRIORITY

This application claims priority under 35 U.S.C. 119(a) to a Korean Patent Application filed on Sep. 19, 2014 in the Korean Intellectual Property Office and assigned Serial No, 10-2014-0125312, the entire disclosure of which is incorporated herein by reference.

BACKGROUND

1. Field of the Disclosure

The present disclosure relates generally to an electronic device and a method capable of handling a touch input, and more particularly, to an electronic device including a touch module configured to recognize a user input selecting an object and a hovering operation of the user input.

2. Description of the Related Art

With the development of information communication technologies, network devices such as a base station and the like are installed throughout a country. An electronic device transmits and receives data to and from another electronic device by way of a network to allow a user to utilize a network throughout a country.

With the trend of digital convergence, various types of electronic devices provide a variety of functions. For example, besides making a call, a smart phone supports connecting to an internet using a network, reproducing music, a video or the like, taking a photo, a video and the like using an image sensor, and the like.

In general, an electronic device provides a user with a variety of information through one display. An electronic device which is equipped with a plurality of displays is being researched and developed to provide the above-described functions.

SUMMARY

An aspect of the present disclosure is to provide an electronic device and a method capable of handling a touch input.

In accordance with an aspect of the present disclosure, an electronic device is provided. The electronic device includes a display including a first area at which an object is displayed and a second area adjacent to the first area, and a touch module configured to recognize a user input selecting the object and an operation in which the user input is hovering, wherein the touch module is further configured to determine that the selection of the object is maintained if the user input is hovering above a specific area.

In accordance with another aspect of the present disclosure, a method in which an electronic device handles a hovering operation is provided. The method includes recognizing a user input selecting an object, recognizing that the hovering operation is performed above a specific area, and determining such that a selection of the object is maintained, wherein a display of the electronic device includes a first area at which the object is displayed and a second area adjacent to the first area.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
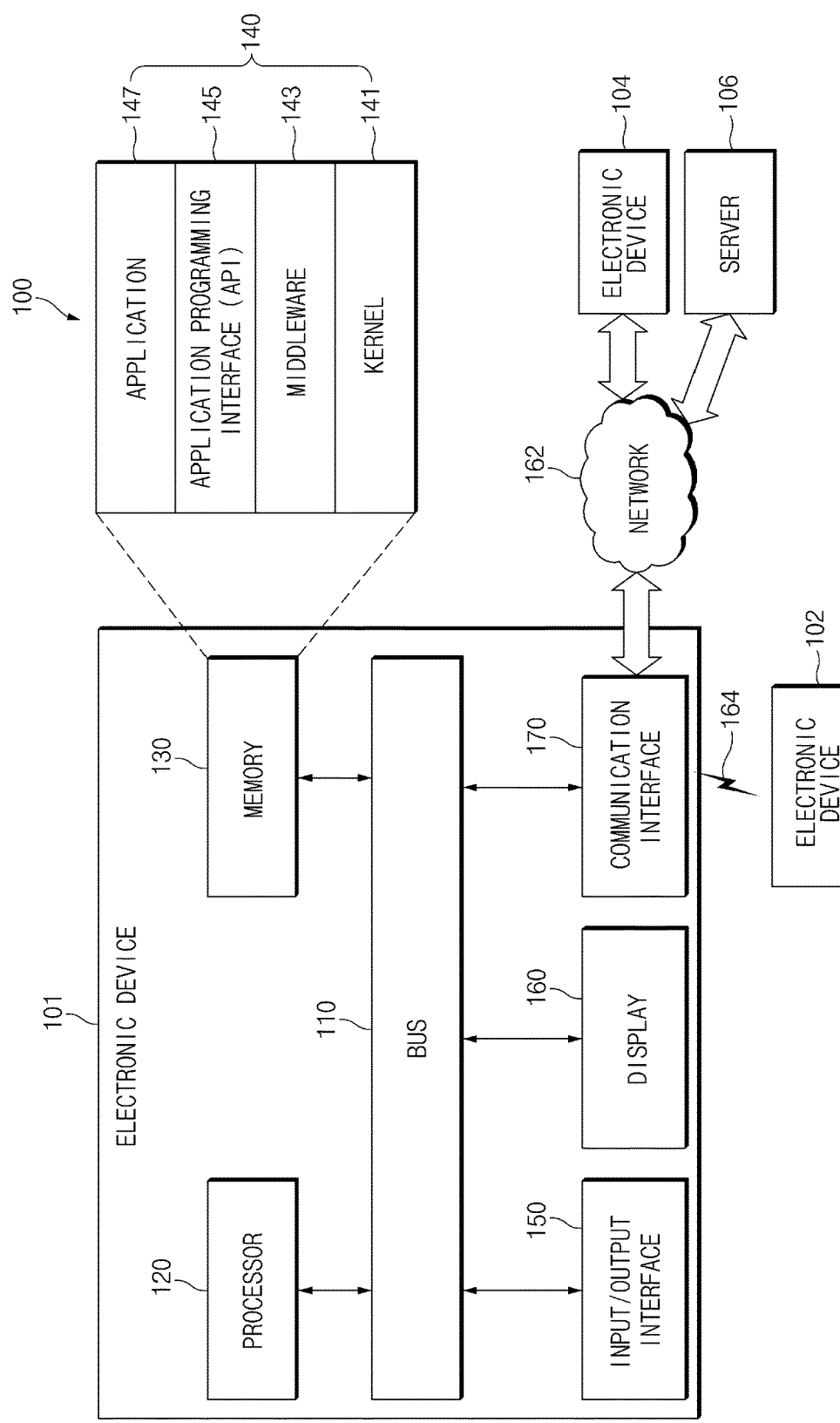
FIG. 1 is a block diagram of an electronic device in a network environment, according to an embodiment of the present disclosure.

Various embodiments of the present disclosure are described below with reference to the accompanying drawings. Accordingly, those of ordinary skill in the art will recognize that a modification, an equivalent, and/or an alternative on the various embodiments described herein can be variously made without departing from the scope and spirit of the present disclosure as defined by the appended claims and their equivalents. With regard to the description of drawings, similar components may be marked by similar reference numerals.

In the present disclosure, the expressions "have," "may have," "include," "comprise," "may include," and "may comprise" used herein indicate the existence of corresponding features (e.g., elements such as numeric values, functions, operations, or components) but do not exclude the presence of additional features.

In the present disclosure, the expressions "A or B," "at least one of A and/or B," and "one or more of A and/or B," and the like used herein may include any and all combinations of one or more of the associated listed items. For example, the term "A or B," "at least one of A and B," and "at least one of A or B" may refer to all of the case (1) where at least one A is included, the case (2) where at least one B is included, or the case (3) where both of at least one A and at least one B are included.

The terms, such as "first," "second," and the like used herein may refer to various elements of various embodiments of the present disclosure, but do not limit the elements. For example, such terms do not limit the order and/or priority of the elements. Furthermore, such terms may be used to distinguish one element from another element. For example, "a first user device" and "a second user device" indicate different user devices. For example, without departing from the scope of the present disclosure, a first element may, be referred to as a second element, and similarly, a second element may be referred to as a first element.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there is no intervening element (e.g., a third element).

According to the situation, the expression "configured to" used herein may be used as, for example, the expressions "suitable for," "having the capacity to," "designed to," "adapted to," "made to," or "capable of." The term "configured to" is not intended to indicate only "specifically designed to" in hardware, Instead, the expression "a device configured to" may indicate that the device is "capable of" operating together with another device or other components. For example, a "processor configured to perform A, B, and C" may indicate a dedicated processor (e.g., an embedded processor) for performing a corresponding operation or a general-purpose processor (e.g., a central processing unit (CPU) or an application processor) which may perform corresponding operations by executing one or more software programs which are stored in a memory device.

Terms used in the present disclosure are used to describe certain embodiments of the present disclosure and are not intended to limit the scope of the present disclosure. The terms of a singular form may include plural forms unless otherwise specified. Unless otherwise defined herein, all the terms used herein, which include technical or scientific terms, may have the same meanings that are generally understood by a person skilled in the art. It will be further understood that terms, which are defined in a dictionary and commonly used, should also be interpreted as is customary in the relevant related art and not in an idealized or overly formal manner unless expressly so defined herein in an embodiment of the present disclosure. In some cases, even if terms are terms which are defined in the present disclosure, they are not intended to be interpreted to exclude an embodiment of the present disclosure.

An electronic device according to an embodiment of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), motion picture experts group (WPEG-1 or MPEG-2) audio layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart watches, and the like.

According to an embodiment of the present disclosure, the electronic devices may be smart home appliances. The smart home appliances may include at least one of, for example, televisions (TVs), digital versatile disc (DVD) players, audio players, refrigerators, air conditioners, cleaners, ovens, microwave ovens, washing machines, air cleaners, set-top boxes, TV boxes (e.g., Samsung HomeSync™, Apple TV™, or Google TV™), game consoles (e.g., Xbox™ and PlayStation™), electronic dictionaries, electronic keys, camcorders, electronic picture frames, and the like.

According to an embodiment of the present disclosure, the electronic devices may include at least one of medical devices (e.g., various portable medical measurement devices (e.g., a blood glucose monitoring device, a heartbeat measuring device, a blood pressure measuring device, a body temperature measuring device, and the like), a magnetic resonance angiography (MRA) machine, a magnetic resonance imaging (MRI) machine, a computed tomography (CT) machine, scanners, and ultrasonic devices) receiving a user input in an idle mode, navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller machines (ATMs), point of sale (POS) devices, or Internet of Things (e.g., light bulbs, various sensors, electric or gas meters, sprinkler devices, fire alarms, thermostats, street lamps, toasters, exercise equipment, hot water tanks, heaters, boilers, and the like).

According to an embodiment of the present disclosure, the electronic devices may include at least one of furniture or buildings/structures, electronic boards, electronic signature receiving devices, projectors, or various measuring instruments (e.g., water meters, electricity meters, gas meters, or wave meters, and the like). The electronic devices according to an embodiment of the present disclosure may be one or more combinations of the above-mentioned devices. According to an embodiment of the present disclosure, an electronic device may be a flexible electronic device. Also, electronic devices according to an embodiment of the present disclosure are not limited to the above-mentioned devices, but may include newly developed electronic devices.

Hereinafter, electronic devices according to an embodiment of the present disclosure will be described with reference to the accompanying drawings. The term "user" used herein may refer to a person who uses an electronic device or a device (e.g., an artificial intelligence electronic device) that uses an electronic device.

FIG. 1 is a block diagram of an electronic device 101 in a network environment 100, according to an embodiment of the present disclosure.

Referring to FIG. 1, electronic device 101 may include a bus 110, a processor 120, a memory 130, an input/output (I/O) interface 150, a display 160, and a communication interface 170. According to an embodiment of the present disclosure, the electronic device 101 might not include at least one of the above-described components or may further include another component(s).

The bus 110 may interconnect the above-described components 110 to 170 and may be a circuit for conveying communications (e.g., a control message and/or data) among the above-described components 110 to 170.

The processor 120 may include one or more of a central processing unit (CPU), an application processor (AP), or a communication processor (CP). The processor 120 may perform, for example, data processing or an operation associated with control or communication of at least one other component(s) of the electronic device 101.

The memory 130 may include a volatile and/or nonvolatile memory. The memory 130 may store instructions or data associated with at least one other component(s) of the electronic device 101. According to an embodiment of the present disclosure, the memory 130 may store software and/or a program 140. The program 140 may include, for example, a kernel 141, a middleware 143, an application programming interface (API) 145, and/or an application (or an application program) 147. At least a portion of the kernel 141, the middleware 143, or the API 145 may be referred to as an operating system (OS).

The kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete components of the electronic device 101 so as to control or manage system resources.

The middleware 143 may perform a mediation role such that the API 145 or the application program 147 communicates with the kernel 141 to exchange data.

Furthermore, the middleware 143 may process task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147. For example, the middleware 143 may process one or more task requests according to the priority assigned to the at least one task requests, which makes it possible to perform scheduling or load balancing on the one or more task requests.

The API 145 may be an interface through which the application program 147 controls a function provided by the kernel 141 or the middleware 143, and may include, for example, at least one interface or function (e.g., an instruction) for file control, window control, image processing, character control, or the like.

The I/O interface 150 may transmit an instruction or data, input from a user or an external device, to another component(s) of the electronic device 101. Furthermore, the I/O interface 150 may output an instruction or data, received from as component(s) of the electronic device 101, to a user or an external device.

The display 160 may include, for example, a liquid crystal display (LCD), a light-emitting diode (LED) display, an organic LED (OLED) display, a microelectromechanical systems (MEMS) display, or an electronic paper display. The display 160 may display for example, various contents (e.g., a text, an image, a video, an icon, a symbol, and the like) to a user. The display 160 may include a touch screen and may receive, for example, a touch, a gesture, a proximity, or a hovering input using an electronic pen or a portion of a user's body.

The communication interface 170 may establish communication between the electronic device 101 and an external electronic device (e.g., a first external electronic device 102, a second external electronic device 104, or a server 106). For example, the communication interface 170 may be connected to a network 162 through wireless communication or wired communication to communicate with the second external electronic device 104 or the server 106.

The wireless communication may include at least one of, for example, long term evolution (LTE), LTE advanced (LTE-A), code division multiple access (CDMA), wideband CDMA (WCDMA), universal mobile telecommunications system (UMTS), wireless broadband (WiBro), global system for mobile communications (GSM), or the like, as a cellular communication protocol. Furthermore, the wireless communication may include, for example, a local area network 164. The local area network 164 may include, for example, at least one of wireless fidelity (Wi-Fi), Bluetooth (BT), near field communication (NFC), GPS, or the like. The wired communication may include at least one of, for example, a universal serial bus (USB), a high definition multimedia interface (HDMI), a recommended standard 132 (RS-132), or a plain old telephone service (POTS). The network 162 may include at least one of the telecommunications networks, for example, a computer network (e.g., a local area network (LAN) or wide area network (WAN)), an interact, or a telephone network.

Each of the first and second external electronic devices 102 and 104 may be a device of which the type is different from or the same as that of the electronic device 101. According to an embodiment of the present disclosure, the server 106 may include a group of one or more servers, According to an embodiment of the present disclosure, all or a part of the operations that the electronic device 101 will perform may be executed by another or plural electronic devices (e.g., the electronic devices 102 and 104 and the server 106). According to an embodiment of the present disclosure, in the case where the electronic device 101 executes any function or service automatically or in response to a request, the electronic device 101 might not perform the function or the service internally, but, alternatively and additionally, it may request at least a portion of a function associated with the electronic device 101 to be performed by the first electronic device 102, the second electronic device 104, or the server 106. The first electronic device 102, the second electronic device 104, or the server 106 may execute the requested function or an additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
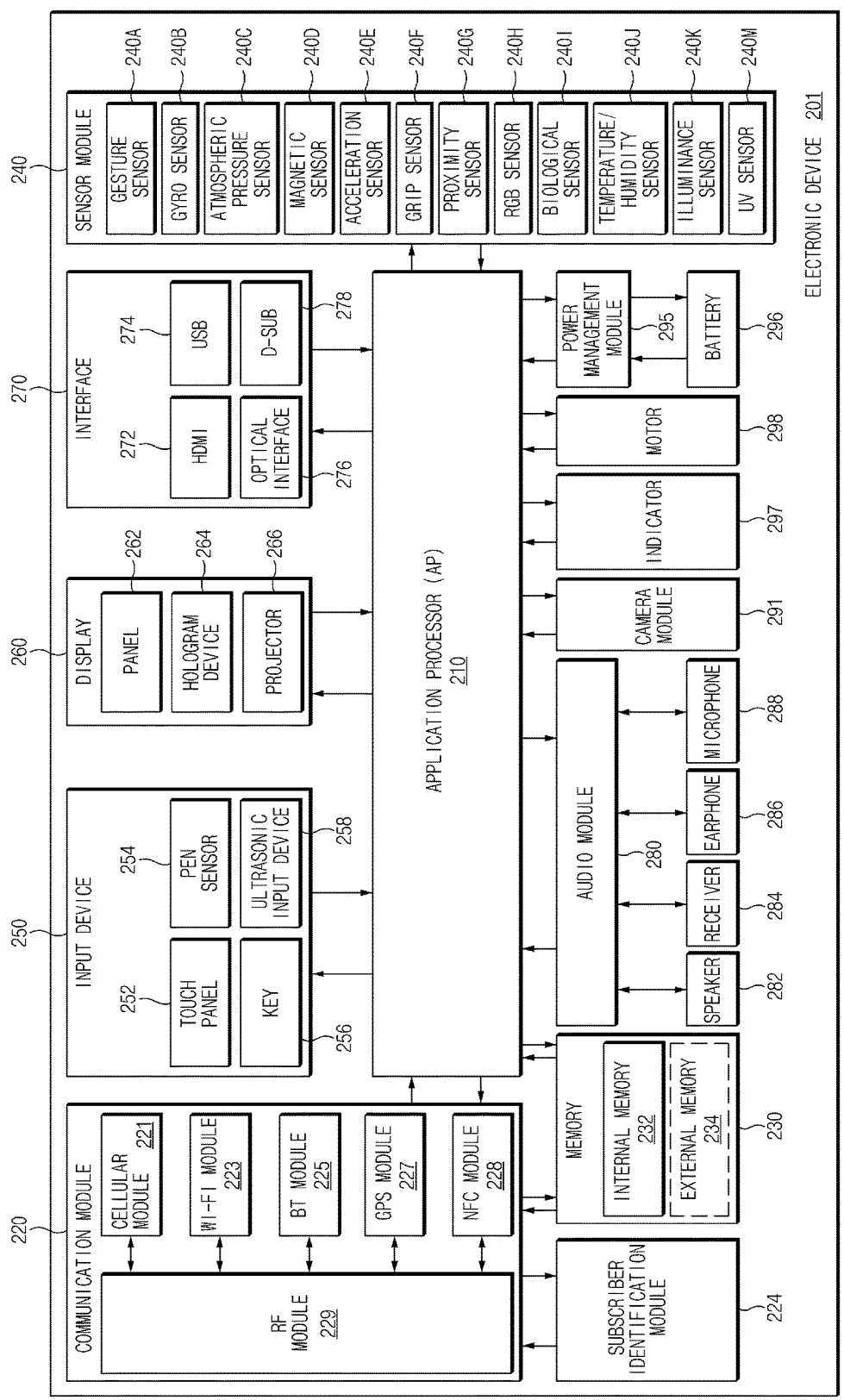
FIG. 2 is a block diagram of an electronic device according to an embodiment of the present disclosure.

FIG. 2 is a block diagram of an electronic device 201 according to various embodiments of the present disclosure.

Referring to FIG. 2, the electronic device 201 may include, for example, all or a part of an electronic device 101 illustrated in FIG. 1. The electronic device 201 may include one or more processors (e.g., an application processor (AP)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may drive an OS or an application to control a plurality of hardware or software components connected to the processor 210 and may process and compute a variety of data. The processor 210 may be implemented with a System on Chip (SoC), for example. According to an embodiment of the present disclosure, the processor 210 may further include a graphics processing unit. (CPU) and/or an image signal processor. The processor 210 may include at least a part (e.g., a cellular module 221) of components illustrated in FIG. 2. The processor 210 may load and process an instruction or data, which is received from at least one other component (e.g., a nonvolatile memory) and may store a variety of data at a nonvolatile memory.

The communication module 220 may be configured the same as or similar to a communication interface 170 of FIG. 1. The communication module 220 may include a cellular module 221, a Wi-Fi module 223, a ST module 225, a ON module 227, an NFC module 228, and a radio frequency (RF) module 229.

The cellular module 221 may provide voice communication, video communication, a character service, an internet service or the like through a communication network. According to an embodiment of the present disclosure, the cellular module 221 may perform discrimination and authentication of an electronic device 201 within a communication network using a SIM 224 card, for example. According to an embodiment of the present disclosure, the cellular module 221 may perform at least a portion of the functions that the processor 210 provides. According to an embodiment of the present disclosure, the cellular module 221 may include a CP.

Each of the Wi-Fi module 223, the BT module 225, the GPS module 227, and the NFC module 228 may include a processor for processing data exchanged through a corresponding module, for example. According to an embodiment of the present disclosure, at least a portion (e.g., two or more components) of the cellular module 221, the Wi-Fi module 223, the BT module 225, the GPS module 227, and the NFC module 228 may be included within one integrated circuit (IC) or an IC package.

The RF module 229 may transmit and receive a communication signal (e.g., an RF signal). The RF module 229 may include a transceiver, a power amplifier module (PAM), a frequency filter, a low noise amplifier (LNA), an antenna, or the like. According to an embodiment of the present disclosure, at least one of the cellular module 221, the Wi-Fi module 223, the BT module 225, the OPS module 227, or the NTC module 228 may transmit and receive an RF signal through a separate RF module.

The SIM 224 may include unique identify information (e.g., an integrated circuit card identifier (ICCID)) or subscriber information (e.g., an integrated mobile subscriber identity (IMSI)).

The memory 230 (e.g., a memory 130 of FIG. 1) may include an internal memory 232 or an external memory 234. For example, the internal memory 232 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory), a hard drive, or a solid state drive (SSD).

The external memory 234 may include a flash drive, for example, a compact flash (CP) drive, a secure digital (SD) memory card, a micro secure digital (Micro-SD) memory card, a mini secure digital (Mini-SD) memory card, an extreme digital (xD) memory card, a multimedia card (MMC), a memory stick, or the like. The external memory 234 may be functionally and/or physically connected to the electronic device 201 through various interfaces.

The sensor module 240 may measure, for example, a physical quantity or may detect an operation state of the electronic device 201. The sensor module 240 may convert the measured or detected information to an electrical signal. The sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, blue (RGB) sensor), a biological sensor 240I, a temperature/humidity sensor 240J, an illuminance sensor 240K, or an ultra violet (UV) light sensor 240M. Additionally or generally, the sensor module 240 may further include, for example, an electronic nose (E-nose) sensor, an electromyography sensor (EMG) sensor, an electroencephalogram (EEG) sensor, an electrocardiogram (ECG) sensor, a photoplethysmographic (PPG) sensor, an infrared (IR) sensor, an iris sensor, and/or a fingerprint sensor. The sensor module 240 may further include a control circuit for controlling at least one or more sensors included therein. According to an embodiment of the present disclosure, the electronic device 201 may further include a processor which is a part of the processor 210 or independent of the processor 210 and is configured to control the sensor module 240. The processor may control the sensor module 240 while the processor 210 remains in a low-power state (e.g. a sleep state).

The input device 250 may include, for example, a touch panel 252, a (digital) pen sensor 254, a key 256, or an ultrasonic input device 258. The touch panel 252 may use at least one of capacitive, resistive, infrared and ultrasonic detecting methods. Also, the touch panel 252 may further include a control circuit. The touch panel 252 may further include a tactile layer to provide a tactile reaction to a user.

The (digital) pen sensor 254 may be, for example, a part of a touch panel or may include an additional sheet for recognition. The key 256 may include, for example, a physical button, an optical key, a keypad, and the like. The ultrasonic input device 258 may detect (or sense) an ultrasonic signal, which is generated from an input device, through a microphone 28 and may check data corresponding to the detected ultrasonic signal.

The display 260 (e.g., a display 160 of FIG. 1) may include a panel 262, a hologram device 264, or a projector 266. The panel 262 may be configured the same as or similar to the display 160 of FIG. 1. The panel 262 and the touch panel 252 may be integrated into a single module. The hologram device 264 may display a stereoscopic image in space using a light interference phenomenon. The projector 266 may project light onto a screen so as to display an image. The screen may be arranged internally or externally to the electronic device 201. According to an embodiment of the present disclosure, the display 260 may further include a control circuit for controlling the panel 262, the hologram device 264, or the projector 266.

The interface 270 may include, for example, an HDMI 272, a USB 274, an optical interface 276, or a D-subminiature connector (D-sub) 278. The interface 270 may be included, for example, in a communication interface 170 illustrated in FIG. 1. Additionally or generally, the interface 270 may include, for example, a mobile high definition link (MHL) interface, an SD card/multi-media card (MMC) interface, or an Infrared Data Association (IrDA) standard interface.

The audio module 280 may convert a sound to an electrical signal and vice versa. At least a portion of the audio module 280 may be included, for example, in an input/output interface 150 illustrated in FIG. 1. The audio module 280 may process, for example, sound information that is input or output through a speaker 282, a receiver 284, an earphone 286, or the microphone 288.

The camera module 291 for shooting a still image or a video may include, for example, at least one image sensor (e.g., a front sensor or a rear sensor), a lens, an image signal processor (ISP), or a flash (e.g., an LED or a xenon lamp).

The power management module 295 may manage, for example, power of the electronic device 201. According to an embodiment of the present disclosure, a power management integrated circuit (PMIC), a charger IC, or a battery gauge may be included in the power management module 295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 296 and a voltage, a current or temperature thereof while the battery 296 is charged. The battery 296 may include, for example, a rechargeable battery or a solar battery.

The indicator 297 may display a state of the electronic device 201 or a portion thereof (e.g., a processor 210), such as a booting state, a message state, a charging state, and the like. The motor 298 may convert an electrical signal into a mechanical vibration and may generate the following effects: vibration, haptic, and the like. A processing device (e.g., a GPU) for supporting a mobile TV may be included in the electronic device 201. The processing device for supporting a mobile TV may process media data according to the standards of digital multimedia broadcasting (DMB), digital video broadcasting (DVB), MediaFlo™, or the like.

Each of the above-mentioned elements of the electronic device 201 according to an embodiment of the present disclosure may be configured with one or more components, and the names of the elements may be changed according to the type of the electronic device 201. The electronic device 201 according to an embodiment of the present disclosure may include at least one of the above-mentioned elements, and some elements may be omitted or other additional elements may be added. Furthermore, some of the elements of the electronic device 201 according to an embodiment of the present disclosure may be combined with each other so as to form one entity, so that the functions of the elements may be performed in the same manner as before the combination.

Figure 3:
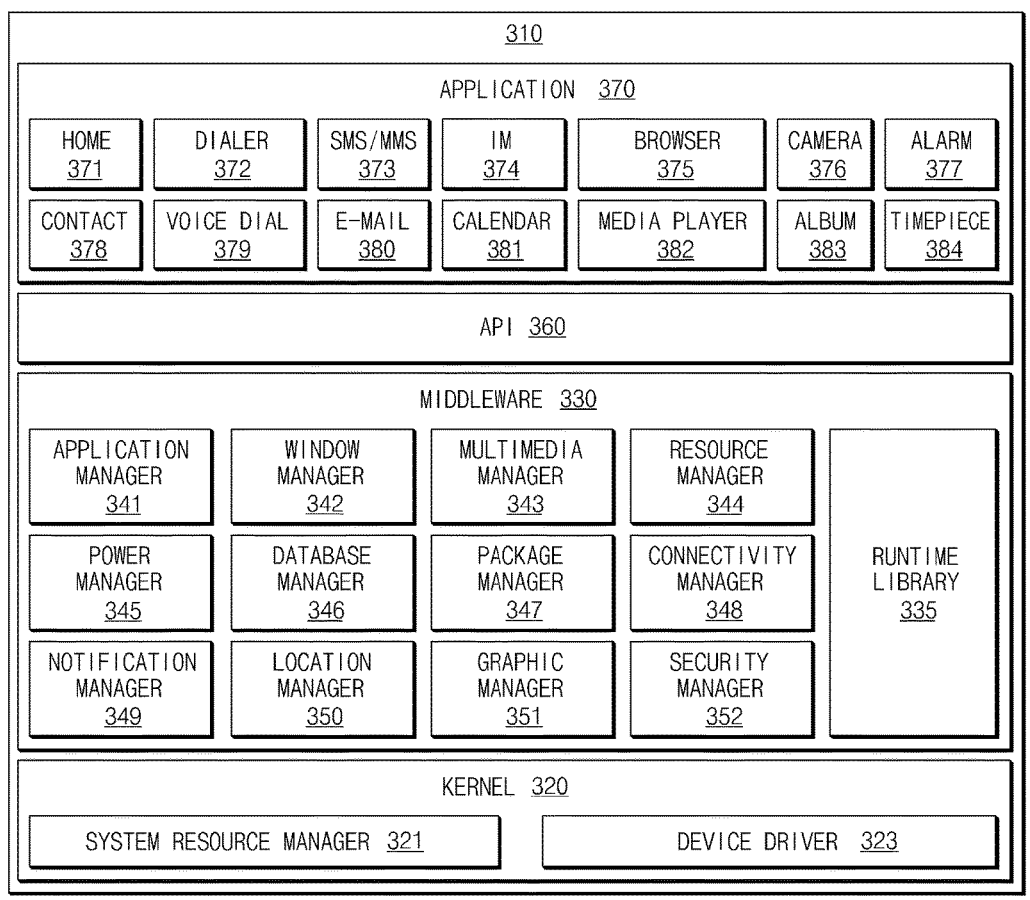
FIG. 3 is a block diagram of a program module according to an embodiment of the present disclosure.

FIG. 3 is a block diagram of a program module 310 according to an embodiment of the present disclosure.

Referring to FIG. 3, according to an embodiment of the present disclosure, a program module 310 (e.g., a program 140 in FIG. 1) may include an OS to control resources associated with an electronic device (e.g., an electronic device 101 of FIG. 1), and/or diverse applications (e.g., an application program 147) driven on the OS. The OS may be, for example, Android, iOS, Windows®, Symbian, Tizen™, or Bada.

The program module 310 may include a kernel 320, a middleware 330, an application programming interface (API) 360, and/or an application 370. At least a part of the program module 310 may be preloaded on an electronic device or may be downloadable from the first external electronic device 102, the second external electronic device 104, a server 106, and the like.

The kernel 320 (e.g., the kernel 141 of FIG. 1) may include, for example, a system resource manager 321 or a device driver 323. The system resource manager 321 may perform control, allocation, or retrieval of system resources. According to an embodiment of the present disclosure, the system resource manager 321 may include a process managing part, a memory managing part, or a file system managing part. The device driver 323 may include, for example, a display driver, a camera driver, a Bluetooth driver, a common memory driver, a USB driver, a keypad driver, a Wi-Fi driver, an audio driver, or an inter-process communication (IPC) driver.

The middleware 330 may provide, for example, a function which the application 370 needs in common, or may provide diverse functions to the application 370 through the API 360 to allow the application 370 to efficiently use limited system resources of the electronic device. According to an embodiment of the present disclosure, the middleware 330 (e.g., the middleware 143 of FIG. 1) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module which is used by a compiler to add a new function through a programming language while the application 370 is being executed. The runtime library 335 may perform input/output management, memory management, or arithmetic function management.

The application manager 341 may manage, for example, a life cycle of at least one application of the application 370. The window manager 342 may manage a graphical user interface (GUI) resource which is used in a screen. The multimedia manager 343 may identify a format necessary for playing diverse media files, and may perform encoding or decoding of media files by using a coder-decoder (codec) suitable for the format. The resource manager 344 may manage resources such as a storage space, a memory, or source code of at least one application of the application 370.

The power manager 345 may operate, for example, with a basic input/output system (BIOS) to manage a battery or power, and may provide power information for an operation of an electronic device. The database manager 346 may generate, search for, or modify a database which is to be used in at least one application of the application 370. The package manager 347 may install or update an application which is distributed in the form of a package file.

The connectivity manager 34 may manage, for example, a wireless connection such as or Bluetooth. The notification manager 349 may display or notify an event such as an arrival message, a promise, or a proximity notification in a mode that does not disturb a user. The location manager 350 may manage location information of an electronic device. The graphic manager 351 may manage a graphics effect that is provided to a user, or manage a user interface relevant thereto. The security manager 352 may provide a general security function necessary for system security or user authentication. According to an embodiment of the present disclosure, in the case where the electronic device 101 includes a telephony function, the middleware 330 may further include a telephony manager for managing a voice or video call function of the electronic device.

The middleware 330 may include a middleware module that combines diverse functions of the above-described components. The middleware 330 may provide a module for each kind of OS to provide differentiated functions. Additionally, the middleware 330 may remove a part of the preexisting components, dynamically, or may add a new component thereto.

The API 360 (e.g., an API 145 of FIG. 1) may be, for example, a set of programming auctions and may be provided with a configuration which is variable depending on an OS. For example, in the case where an OS is the Android or the iOS, it may be permissible to provide one API set per platform. In the case where an OS is the Tizen™, it may be permissible to provide two or more API sets per platform).

The application 370 (e.g., an application program 147 of FIG. 1) may include, for example, one or more applications capable of providing functions for a home 371, a dialer 372, a short message service/multimedia messaging service (SMS/MMS) 373, an instant message (IM) 374, a browser 375, a camera 376, an alarm 377, a contact 378, a voice dial 379, an e-mail 380, a calendar 381, a media player 382, an album 383, and a timepiece 384, or for offering health care (e.g., measuring an exercise quantity or a blood sugar level) or environmental information (e.g., atmospheric pressure, humidity, or temperature information).

According to an embodiment of the present disclosure, the application 370 may include an application (hereinafter an "information exchanging application") to support information exchange between the electronic device 101 and an external electronic device 102 or 104. The information exchanging application may include, for example, a notification relay application for transmitting specific information to the external electronic device 102 or 104, or a device management application for managing the external electronic device 101.

For example, the information exchanging application may include a function of transmitting notification information, which arise from other applications (e.g., applications for SMS/MMS, e-mail, health care, or environmental information), to an external electronic device 102 or 104. Additionally, the information exchanging application may receive, for example, notification information from an external electronic device 102 or 104 and provide the notification information to a user.

The device management application may manage (e.g., install, delete, or update), for example, at least one function (e.g., turn-on/turn-off of an external electronic device 102 or 104 (or a part of components) or adjustment of brightness (or resolution) of a display) of the external electronic device 102 or 104 which communicates with the electronic device 101, an application running in the external electronic device 102 or 104, or a service (e.g., a call service or a message service) provided from the external electronic device 102 or 104.

According to an embodiment of the present disclosure, the application 370 may include an application (e.g., a health care application) which is assigned in accordance with an attribute (e.g., an attribute of a mobile medical device as a kind of electronic device) of the external electronic device 102 or 104. According to an embodiment of the present disclosure, the application 370 may include an application which is received from a server 106 or an external electronic device 102 or 104. According to an embodiment of the present disclosure, the application 370 may include a preloaded application or a third party application which is downloadable from a server. The component titles of the program module 310 according to the embodiment of the present disclosure may be modifiable depending on the kind of OS.

According to an embodiment of the present disclosure, at least a portion of the program module 310 may be implemented by software, firmware, hardware, or a combination of two or more thereof. At least a portion of the program module 310 may be implemented (e.g., executed), for example, by a processor (e.g., a processor 210 of FIG. 2). At least a portion of the program module 310 may include, for example, modules, programs, routines, sets of instructions, or processes, or the like for performing one or more functions.

Figure 4:
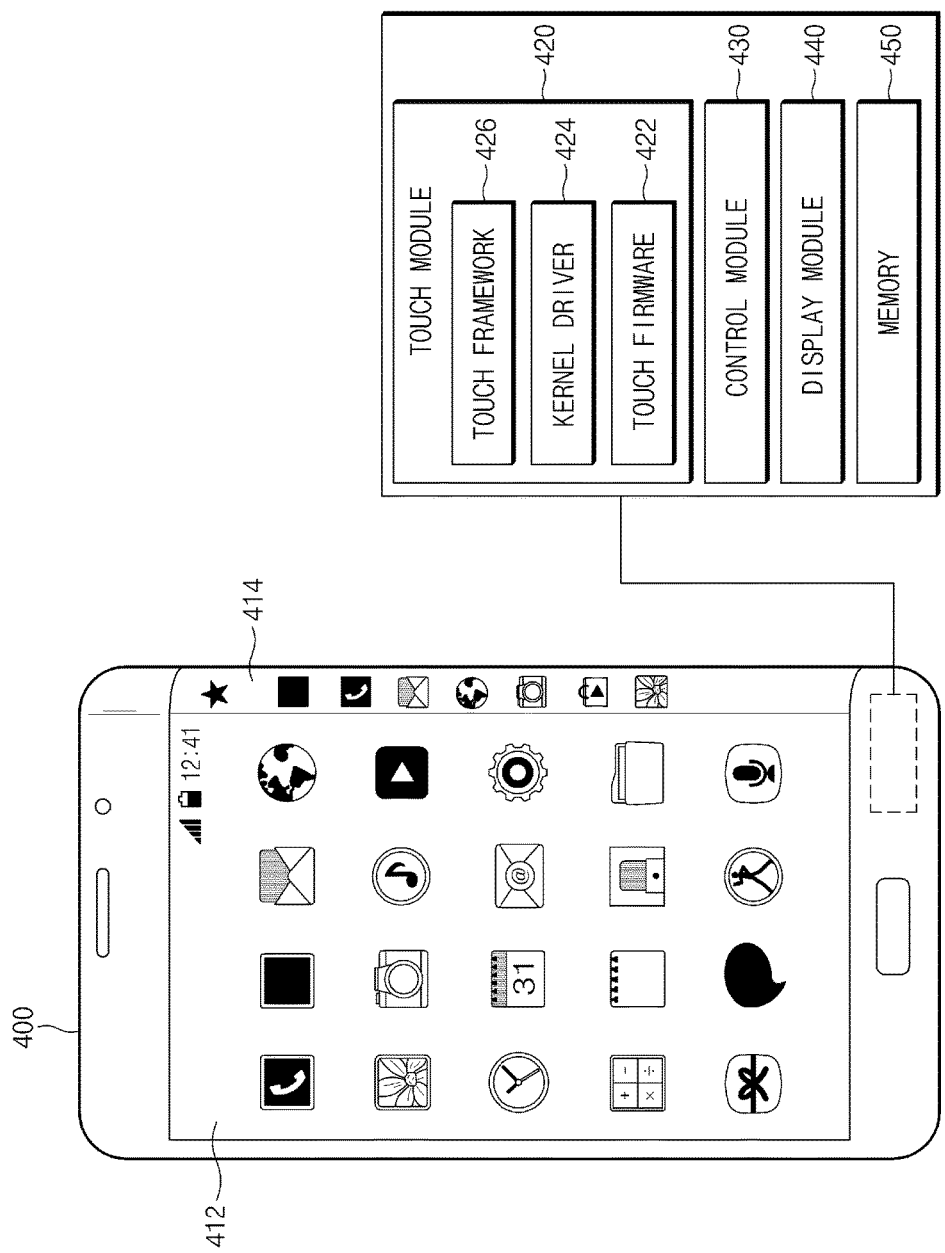
FIG. 4 is a diagram of an electronic device according to an embodiment of the present disclosure.

FIG. 4 is a diagram of an electronic device 400 according to an embodiment of the present disclosure. Referring to FIG. 4, an electronic device 400 may include a display including a first display area 412 and a second display area 414, a touch module 420, a control module 430, a display module 440, and a memory 450. According to an embodiment of the present disclosure, a curvature of the first display area 412 may be different from that of the second display area 414. For example, the first display area 412 may be a curved area having a first curvature, and the second display area 414 may be a curved area having a second curvature. In this case, each of the first display area 412 and the second display area 414 may be a display having a curvature, and curvatures of the first and second display areas 412 and 414 may be different from each other. Unlike the above example, according to an embodiment of the present disclosure, the first display area 412 may be a flat display of which the curvature is "0," and the second display area 414 may be a curved display of which the curvature is not "0." Below, a description is provided under the condition that the first display area 412 is a flat area and the second display area 414 is a curved area.

The electronic device 400 illustrated in FIG. 4 may be at least one of various embodiments of the present disclosure and may be variously changed or modified based on components illustrated in FIG. 4. For example, the electronic device 400 may further include a user interface which is used to receive an instruction or information, for example, a user input. In this case, the user interface may be, for example, input devices such as a keyboard, a mouse, and the like.

The electronic device 400 illustrated in FIG. 4 may correspond to the case where an application or a widget program is not displayed (hereinafter a "default state"). Referring to FIG. 4, the first display area 412 may display icons corresponding to a plurality of applications. The curved display area 414 may display a bookmark application user interface (UI) which is previously set by a user or is previously set.

According to an embodiment of the present disclosure, the electronic device 400 may execute an application based on a user input, and the executed application may be displayed on the first flat area 412. In this case, the bookmark application UA illustrated in FIG. 4 may be displayed at the curved area of the second display area 414 without modification; on the other hand, a UI corresponding to the executed application may be displayed. For example, in the case where an image gallery application is executed, at least one or more photo folders may be displayed on the curved area of the second display area 414. Likewise, in the case where an ebook application is executed, at least one or more e-book folders may be displayed on the curved area of the second display area 414.

The display may include a configuration which is at least the same as or similar to a display 260 illustrated in FIG. 2. The display which is a touch screen may include a touch panel (e.g., a touch panel 252 of FIG. 2).

The touch module 420 may include touch firmware 422, a kernel driver 424, and a touch framework 426.

The touch firmware 422 may determine whether a user input (e.g. a user's finger or a stylus such as a Samsung S Pen™ and the like) received at the flat area of the first display area 412 or the curved area of the second display area 414 is a touch input physically contacting with the flat area of the first display area 412 or the curved area of the second display area 414 or a hovering input not physically contacting therewith. Furthermore, the touch firmware 422 may receive coordinates of the user input from the touch panel.

The touch firmware 422 may provide the kernel driver 424 with coordinate information of the user input and whether or not the user input is a hovering input, that is, a type of the user input as a parameter.

The kernel driver 424 may transfer the received coordinate information and the type of the user input, which are provided from the touch firmware 422, to the touch framework 426.

The touch framework 426 may determine whether to activate a specific operation, based on the received coordinate information and the type of the user input. For example, in the case where the received coordinate information and the type of the user input satisfy a specific condition, the touch framework 426 may determine to perform a specific operation. Even though received coordinate information and the type of the user input satisfy a specific condition, if a user setting is such that the specific operation is not to be performed, the touch framework 426 determines not to perform the specific operation.

Below, a specific condition and a specific operation are described with reference to FIGS. 5A and 5B.

Figure 5A:
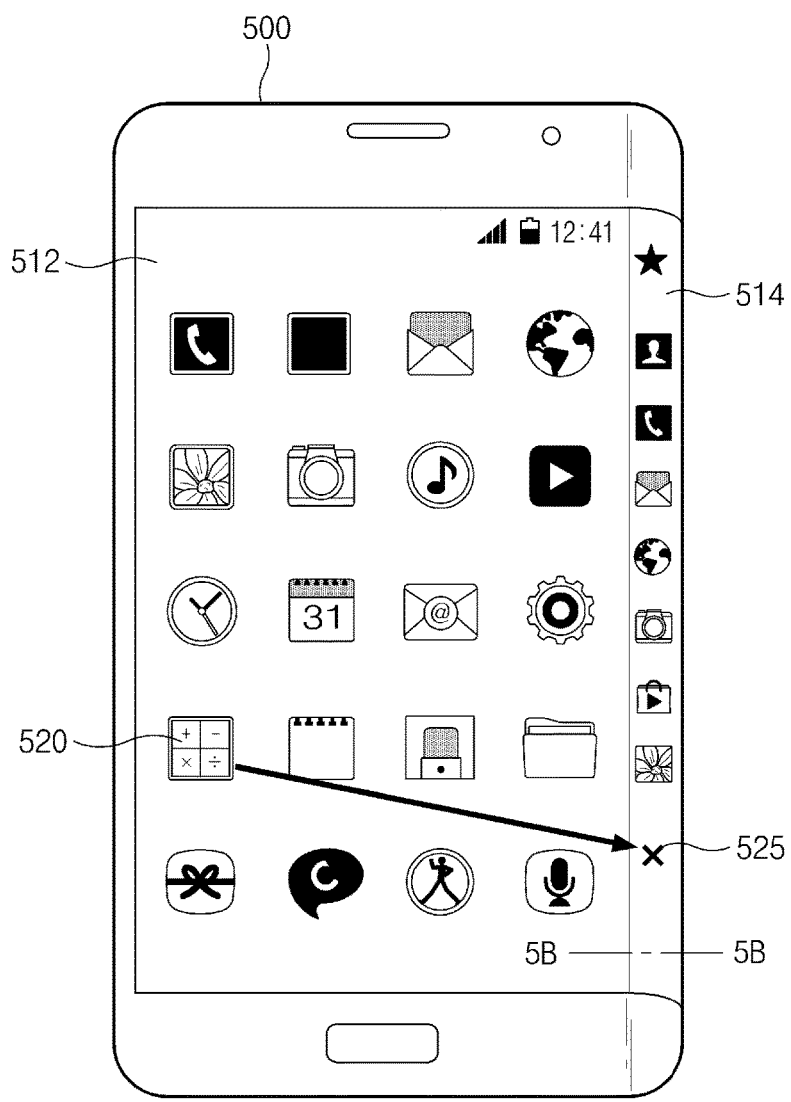
FIG. 5A is a diagram illustrating handling of a touch input performed on a display of an electronic device, according to an embodiment of the present disclosure.

FIG. 5A is a diagram illustrating handling of a touch input performed at a first display area 512 and a second display 514 of an electronic device 500, according to an embodiment of the present disclosure.

Referring to FIG. 5A, the electronic device 500 may include a display which includes a flat area of the first display 512 and a curved area of the second display area 514. A touch panel of the electronic device 500 may receive a touch input selecting an object 520 displayed at the flat area of the first display area 512, for example, an icon of a calculator application. The touch input may move into the curved area of the second display area 514 on the touch panel and may hover above the curved area of the second display area 514.

The touch firmware 422 may recognize the touch input and the hovering and may receive coordinate information of the touch input and coordinate information of the hovering from the touch panel. The touch firmware 422 may further receive coordinate information on movement of the touch input from the flat area of the first display area 512 to the curved area of the second display area 514 from the touch panel. The kernel driver 424 may recognize the touch input as a touch down event, the movement of the touch input as a touch drag (or a touch move) event, and the hovering as a touch release event. The kernel driver 424 may transfer information, associated with the touch down event, the touch drag event, and the touch release event, and coordinate information thereof, to the touch framework 426.

The touch framework 426 may determine that hovering is made above the curved area of the second display area 514 after a touch input on an object 520 which is received at the flat area of the first display area 512 moves into the curved area of the second display area 514 on the display, using information received from the kernel driver 414. Thus, the touch framework 426 may maintain selection on the object 520 even though the touch release event is generated. In this case, the display module 440 may mark an indicator 525, for example, a pointer at the coordinates where the hovering is generated. According to an embodiment of the present disclosure, the indicator 525 may be a scaled-down image of the object 520 as well as the above-described pointer.

According to an embodiment of the present disclosure, the touch framework 426 may determine whether to maintain the selection on the object 520, using coordinate information, associated with a horizontal axis of the electronic device 500, from among the coordinate information. However, in the case where the curved area 514 is implemented at the top or bottom of a screen of the electronic device 500, not the left or right thereof, the touch framework 426 may determine whether to maintain selection on the object 520, using coordinate information, associated with a vertical axis of the electronic device 500, from among the coordinate information.

In the case where the user input which is hovering moves on the curved area of the second display area 514, the indicator 525 may move on the curved area of the second display area 514 along the movement of the hovering user input.

Furthermore, in the case where a touch operation of the hovering user input is performed with respect to the curved area of the second display area 514 or in the case where a hovering click operation of the hovering user input is performed with respect to the curved area of the second display area 514, the object 520 may be displayed at a location where the indicator 525 is displayed. The hovering click operation may indicate an operation (e.g. slightly clicking a touch panel) in which a finger or a stylus moves into the curved area of the second display area 514 while a hovering state is maintained within a hovering-possible area. In this case, whether the hovering click operation is accomplished may be determined according to a capacitance change due to the user input. The touch framework 426 may terminate the selection on the object 520 based on a touch operation or a hovering click operation of the hovering user input.

According to an embodiment of the present disclosure, in the case where an indicator is displayed on an application icon, the object 520 may push the application icon into a next order and may be moved to a corresponding location, which is performed based on the touch operation or the hovering click operation of the hovering user input. However, in the case where the indicator is displayed on a folder icon, the object 520 may go into the folder icon, based on the touch operation or the hovering click operation of the hovering user input.

According to an embodiment of the present disclosure, as a user clicks a button of the stylus, the object 520 may be displayed at a location where the indicator is displayed. However, in the case where the user input gets out of a hovering possible area above the curved area of the second display area 514, the touch framework 426 may terminate the selection on the object 520.

In FIG. 5A, an embodiment of the present disclosure is illustrated where the object 520 is an application icon. However, the present disclosure is not limited thereto. For example, various types of objects capable of moving or being copied may be used. For example, the object may include an image, an e-book, music, a video, various documents and files, and the like as well as the application icon. Furthermore, as described above, moving or copying of the object may be performed at a state at which various applications are executed, as well as the default state. For this reason, it may be understood that the object includes an image, an e-book, music, a video various documents and files, and the like.

Figure 5B:
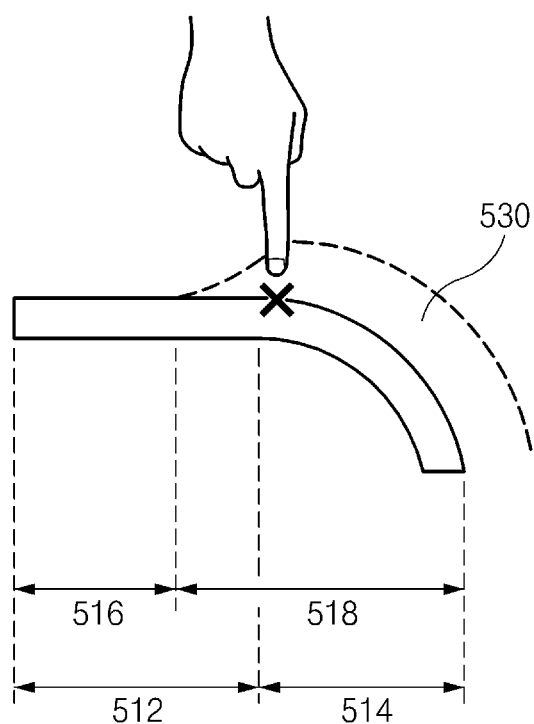
FIG. 5B is a cross-sectional view of a flat area of a first display area and a curved area of a second display area of an electronic device taken along a line 5B 5B of FIG. 5A, according to an embodiment of the present disclosure.

FIG. 5B is a cross-sectional view of a flat area of the first display area 512 and a curved area of the second display area 514 of an electronic device 500 taken along a line 5B-5B of FIG. 5A, according to an embodiment of the present disclosure. As described above, specific conditions in which a touch framework 426 maintains selection of an object 520 even though a touch release event is generated may include 1) a touch input on the object 520 at a flat area of the first display area 512, 2) movement of the touch input from the flat area of the first display area 512 to a curved area of the second display area 514, and 3) hovering of the touch input above the curved area of the second display area 514. However, according to an embodiment of the present disclosure, the second condition and the third condition may be somewhat changed. For example, as illustrated in FIG. 5B, as a simplified reference, the second condition and the third condition may include the case where the touch input moves into an area 518 and is hovering above the area 518. The reason may be that a boundary between the flat area of the first display area 512 and the curved area of the second display area 514 may be ambiguous.

In this case, an area 530 may be depicted as an area where the hovering is recognized as a specific condition of maintaining selection of the object 520.

An operation of a control module 430 is described below with reference to FIG. 4. As described above, a display module 440 may display an indicator at a location where a user input is hovering above a curved area of the second display area 414. Also, the display module 440 may move the indicator on the curved area of the second display area 414, based on movement of the hovering user input.

The control module 430 may emphasize an icon, a label, a tap, a folder, and the like which are covered by the indicator. For example, the control module 430 may enlarge scales of the icon, label, tap, folder and the like or may change colors thereof. Alternatively, the control module 430 may display an animation. The control module 430 may be configured, for example, to be at least the same as or similar to a processor 120 illustrated in FIG. 1.

Below, an operation of the control module 430 is described with reference to FIG. 6.

Figure 6:
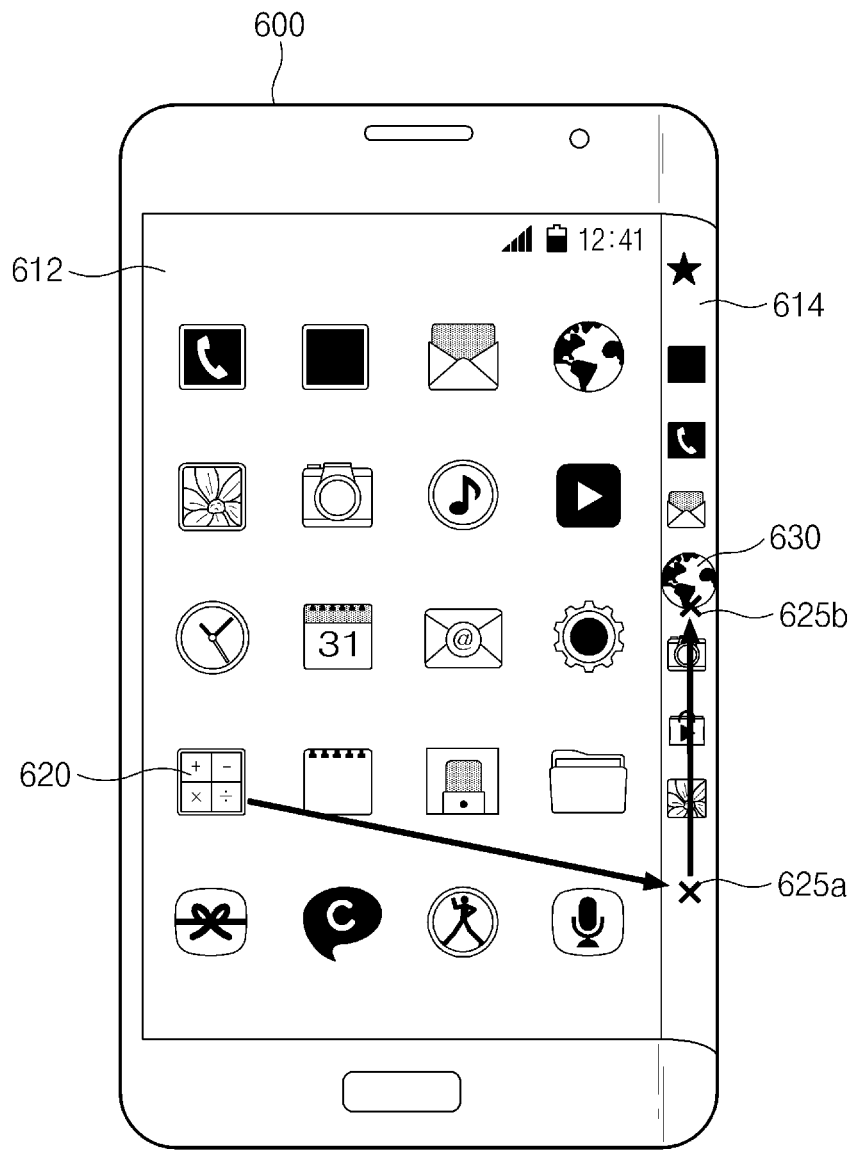
FIG. 6 is a diagram illustrating an icon emphasized according to a location of an indicator in an electronic device, according to an embodiment of the present disclosure.

FIG. 6 is a diagram illustrating an icon 630 emphasized according to a location of an indicator 625a or 625b in an electronic device 600, according to an embodiment of the present disclosure.

Referring to FIG. 6, the electronic device 600 may receive a touch input on an object 620 on a flat area of a first display area 612. The touch input may move onto a curved area of a second display area 614 and may hover, which allows a display module 440 to display an indicator 625a on the curved area of the second display area 614. The indicator 625a may move into a location of an indicator 625b, based on movement of the hovering user input. Also, it may be understood from FIG. 6 that an application icon 630 is previously placed at a location of the indicator 625b.

The indicators 625a and 625b may indicate locations where an object 620 is to be displayed. However, compared to the flat area of the first display area 612, the curved area of the second display area 614 may be limited in space and may include small-sized application icons, thereby making it difficult for a user to determine a location at which the object 620 is to be displayed. As illustrated in FIG. 6, the control module 430 may enlarge a scale of the application icon 630, based on a location of the indicator 625b; therefore, a user may perceive that a location of the indicator 625b is currently overlapped on the application icon 630 and may move a location of the indicator 625b such that a location where the object 620 is to be displayed is not overlapped with the application icon 630.

Returning again to FIG. 4, a memory 450 may store data. The memory 450 may be configured, for example, to be at least the same as or similar to a memory 130 illustrated in FIG. 1. In this case, data stored at the memory 450 may include data exchanged between components in the electronic device 400 and may include data exchanged between the electronic device 400 and components external to the electronic device 400. For example, coordinate information of a location where a user input event is generated may be stored in the memory 450. Furthermore, information on whether the user input is a touch input or a hovering input and information on a type of a user input may be stored in the memory 450.

The memory 450 may include, for example, a hard disk drive, a ROM, a RAM, a flash memory, a memory card or the like which exists external or internal to the electronic device 400.

It may be understood that the flat area of the first display area 412, the curved area of the second display area 414, the touch module 420, the control module 430, the display module 440, and the memory 450 are implemented independently of each other or two or more thereof are integrated.

An embodiment of the present disclosure may not be limited to the case where an object is moved or is copied to a location where the indicator is displayed. For example, in the case where touch-possible icons (e.g. objects) are gathered (or grouped), it may be difficult for a user to select a desired icon by his/her finger. An icon may be covered by his/her finger, or an undesirable icon may be selected due to an area of a contact surface where his/her finger is in contact with a display. In this case, if a pointer is located at a location at which his/her finger is hovering, after performing a drag operation from any area, a desired icon may be easily selected.

Furthermore, an embodiment of the present disclosure may include the case where a curvature of a first area of the first display area 412 is not different from that of a second area of the second display area 414, for example, the case where the first area of the first display area 412 and the second area of the second display area 414 are each flat.

Below, an embodiment of the present disclosure is described with reference to FIGS. 7 to 10.

Figure 7:
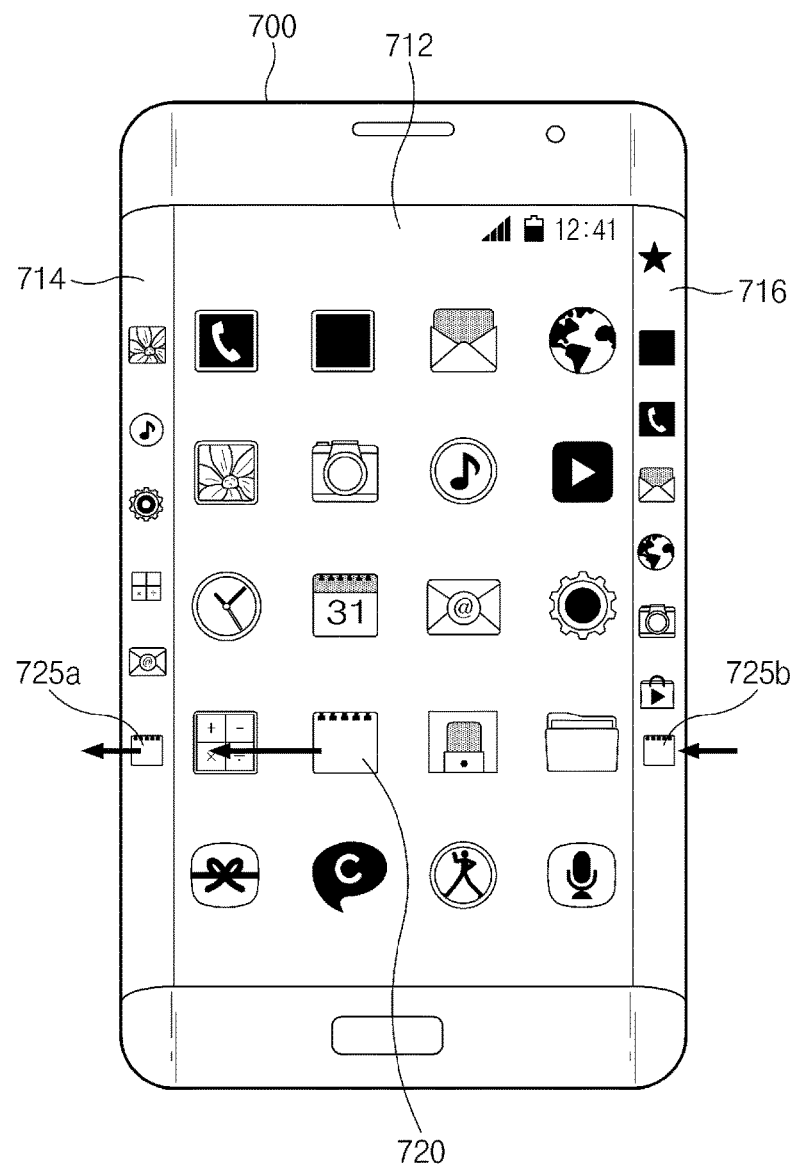
FIG. 7 is a diagram illustrating a change in an indicator according to movement of a user input hovering above a curved area in an electronic device including two curved areas, according to an embodiment of the present disclosure.

FIG. 7 is a diagram illustrating a change in an indicator 725 according to movement of a user input hovering above a first curved area of a first display area 714 or a second curved area of a second display area 716 in an electronic device 700 including the two curved areas of the first display area 714 and the second display area 716, according to an embodiment of the present disclosure. In view of the above description, in an embodiment of the present disclosure, an indicator displayed on a curved area may have a pointer shape, but it may have the appearance of a selected object. An example of an embodiment of the present disclosure is illustrated in FIG. 7 as indicators 725a and 725b, which have the appearance of a selected object 720.

The electronic device 700 may receive a touch input selecting the object 720, and the touch input may move into a first curved area of the first display area 714 and may hover. Accordingly, the indicator 725a may be displayed at a location where the touch input hovers. As described above, in the case where the hovering user input moves out of a hovering-possible area above a curved area, the touch framework 426 may terminate the selection of the object.

However, according to an embodiment of the present disclosure, in the case where the electronic device 700 has two curved areas as illustrated in FIG. 7, a first curved area of the first display area 714 and a second curved area of the second display area 716 may be interlocked for the user's convenience. For example, in the case where a user input hovering above the first curved area of the first display area 714 moves outside of the electronic device 700 in a direction extending from a flat area of a third display area 712 to the first curved area of the first display area 714, the touch framework 426 may not terminate selection of the object 720. In this case, the display module 440 may move and display the indicator 725a, which is displayed on the first curved area of the first display area 714, into the indicator 725b on the second curved area of the second display area 716.

Figure 8:
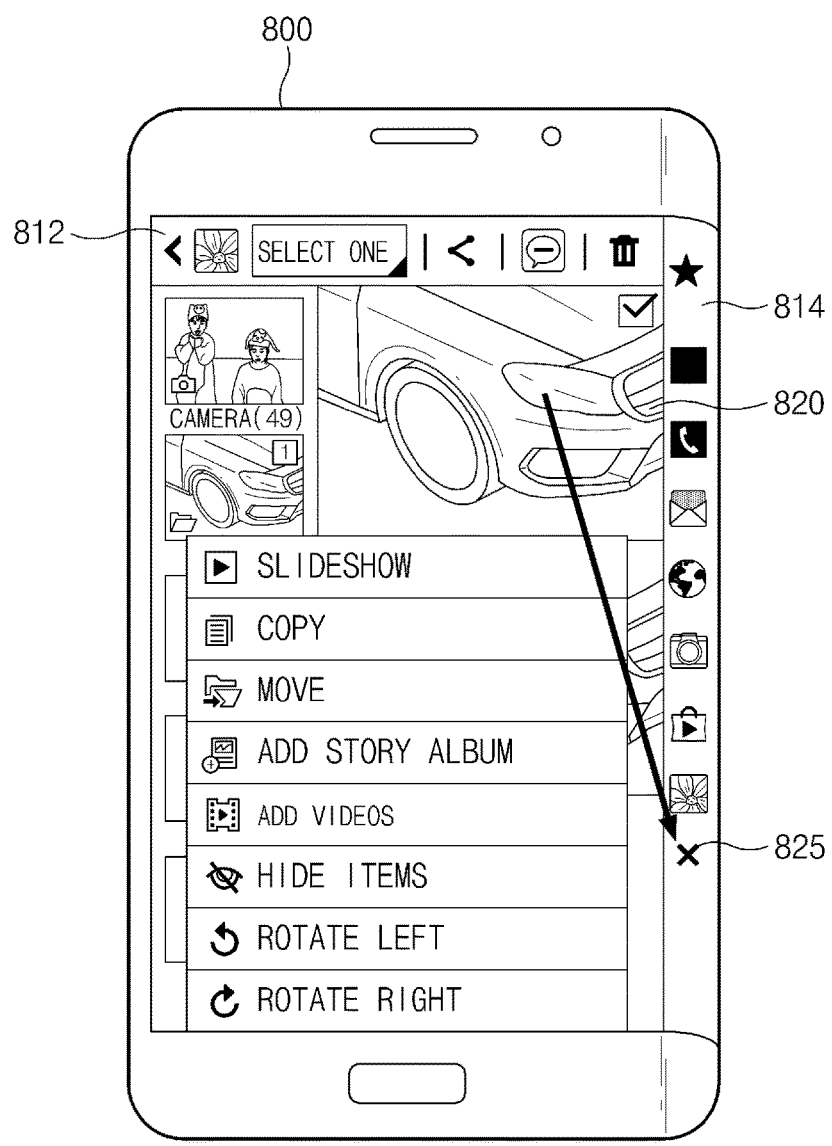
FIG. 8 is a diagram illustrating moving of an image, selected as an object, onto a curved area in an image gallery application of an electronic device, according to an embodiment of the present disclosure.

FIG. 8 is a diagram illustrating moving of an image 820, selected as an object, onto a curved area of a first display area 814 in an image gallery application of an electronic device 800, according to an embodiment of the present disclosure.

Referring to FIG. 8, an image gallery application execution screen may be displayed at a flat area of a second display area 812 of an electronic device 800. In this case, a bookmark application UI may be displayed at a curved area of the first display area 814.

In the case where a touch input moves onto the curved area of the first display area 814 and hovers, the image 820 which is selected as an object on the flat area of the second display area 812 through the touch input may move into a location where an indicator 825 is displayed. As described above, in addition to a hovering user input, a touch input or a hovering click operation may be additionally required to move the selected image 820 into a location where the indicator 825 is displayed.

The bookmark application UI may be used as temporary storage for the moved image 820. A user may move the image 820, which is shifted into the bookmark application UI, into an application execution screen or a screen of a default state displayed at the flat area of the second display area 812.

Figure 9:
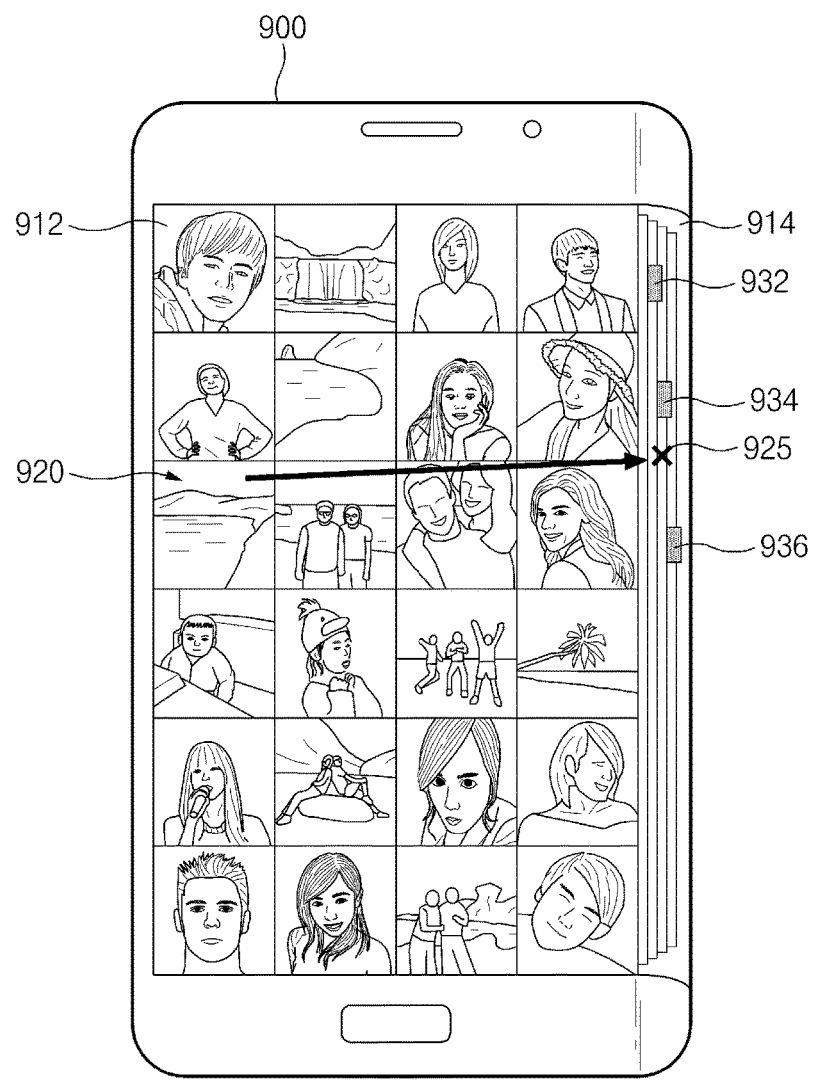
FIG. 9 is a diagram illustrating moving of an image, selected as an object, onto a curved area in an image gallery application of an electronic device, according to an embodiment of the present disclosure.

FIG. 9 is a diagram illustrating moving of an image 920, selected as an object, onto a curved area of a first display area 914 in an image gallery application of an electronic device 900, according to an embodiment of the present disclosure.

Referring to FIG. 9, an image gallery application execution screen may be displayed at a flat area of a second display area 912 of an electronic device 900. In this case, unlike in FIG. 8, a UI corresponding to the executed image gallery application may be displayed at the curved area of the first display area 914.

A UI corresponding to the executed image gallery application may include bookmarks 932, 934, and 936 for each of three image folders. To change a stored location (e.g. a folder) of an image 920, a user may touch the image 920 on a flat area of a third display area 912 by his/her finger (or a stylus), drag the image 920 into a curved area of the first display area 914, and detach his/her finger from the curved area of the first display area 914. A display module 440 may display an indicator 925 at a location from which a user's finger is detached. In this case, to change a stored folder of the image 920, a user may maintain his/her finger at a hovering-possible height and may move onto a bookmark of a folder at which the image 920 is to be newly stored, for example, the second bookmark 934. As described above, in the case where a user's finger moves onto the second bookmark 934, the control module 430 may enlarge a size of the second bookmark 934, may change a color thereof, or may present an animation effect.

Figure 10:
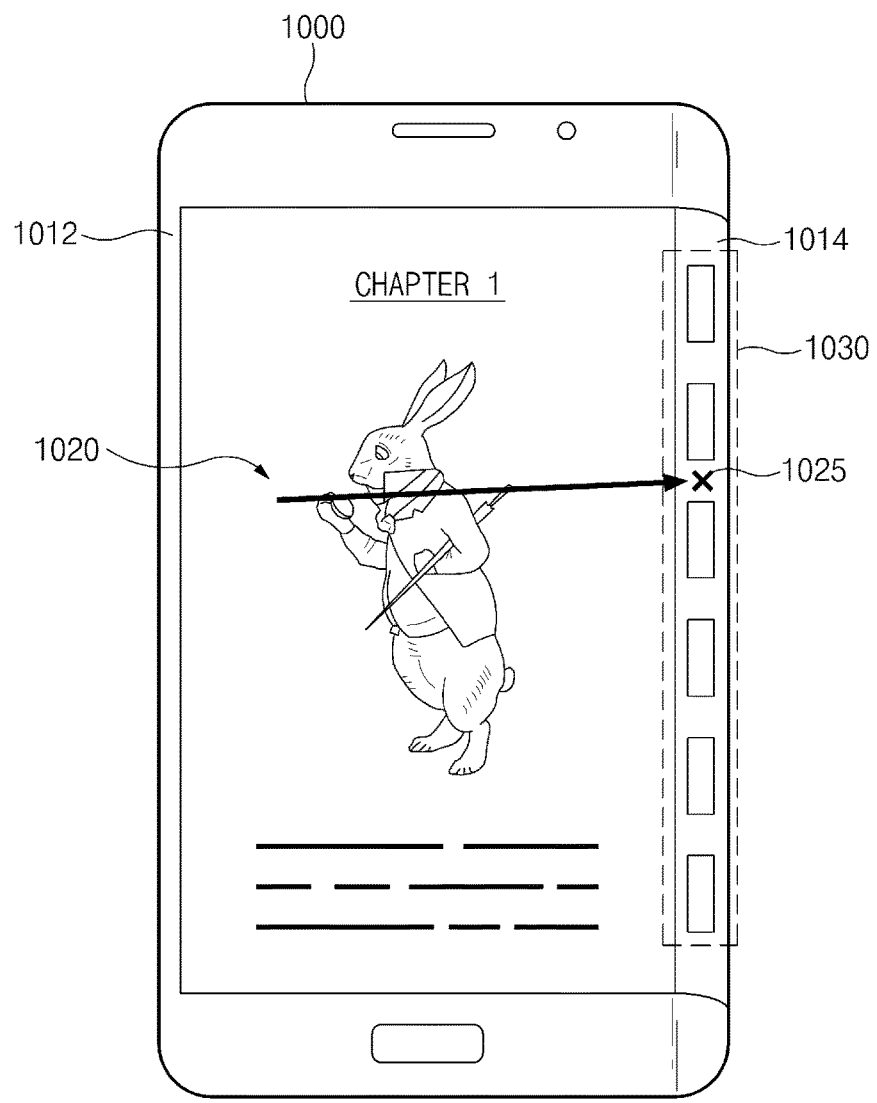
FIG. 10 is a diagram illustrating moving of an electronic book (e-book), selected as an object, onto a curved area in an e-book application of an electronic device, according to an embodiment of the present disclosure.

FIG. 10 is a diagram illustrating moving of an e-book 1020, selected as an object, onto a curved area of a first display area 1014 in an e-book application of an electronic device 1000, according to an embodiment of the present disclosure.

Referring to FIG. 10, an e-book application execution screen may be displayed at a flat area of a second display area 1012 of an electronic device 1000. In this case, a UI corresponding to the executed e-book application may be displayed at a curved area of the first display area 1014.

Referring to FIG. 10, the UI corresponding to the executed e-book application may include an e-book storage folder 1030 for a specific genre. The changing of stored folders of e-books arranged in a list shape may be performed similarly to the changing of a stored image folder of FIG. 9. The changing of a stored folder of an executed e-book 1020 is described below.

To change a stored location (e.g. folder) of an e-book 1020, a user may touch the e-book 1020 on a flat area of the second display area 1012 by his/her finger (or a stylus), drag the e-book 1020 into a curved area 1014, and detach his/her finger from the curved area 1014. A display module 440 may display an indicator 1025 at a location from which a user's finger is detached. In this case, to change a stored folder of the e-book 1020, a user may maintain his/her finger at a hovering-possible height and may move onto a folder at which the e-book 1020 is to be newly stored.

An electronic device according to an embodiment of the present disclosure may include a display including a first area at which an object is displayed and a second area adjacent to the first area, and a touch module configured to recognize a user input selecting the object and a hovering operation of the user input. For example, the touch module may recognize an operation in which the hovering operation of the touch input is performed at a specific area and may determine that a selection on the object is to be maintained.

According to an embodiment of the present disclosure, a curvature of a first area may be different from that of a second area.

According to an embodiment of the present disclosure, a specific area may include at least a portion, adjacent to a second area, of a first area and the second area.

According to an embodiment of the present disclosure, an electronic device may further include a display module which displays an indicator at a location at which a user input hovers. In this case, the indicator may be a pointer or a selected object.

According to an embodiment of the present disclosure, a touch module may recognize an operation in which a hovering user input moves above a specific area, and a display module may move and display an indicator so as to correspond to a movement of the hovering user input. The touch module may recognize an operation in which the hovering user input moves out of a specific area and releases the selection of an object. Also, according to an embodiment of the present disclosure, the touch module may recognize an operation in which the hovering user input moves out of a hovering-possible height above a specific area and releases a selection of an object.

According to an embodiment of the present disclosure, an electronic device may further include a control module which provides a display change of an object, overlapped with an indicator, from among objects displayed on a second area. The display change on the overlapped object may be a change in a scale of the overlapped object, a change in a color of the overlapped object, or a display presenting an animation effect on the overlapped object.

According to an embodiment of the present disclosure, a touch module may recognize a touch input or a hovering click operation of a hovering user input on a specific area, and a display module may display a selected object at a location corresponding to the touch input or the hovering click operation of the hovering user input.

According to an embodiment of the present disclosure, a display may further include a third area adjacent to a first area in a direction extending from a second area to the first area, and the touch module may recognize an operation in which a hovering user input moves out of a specific area of the second area.

According to an embodiment of the present disclosure, if an operation in which a hovering user input moves out of a specific area on a second area is an operation in which the hovering user input moves from the specific area to a first area, the touch module may release a selection of the object.

If an operation in which a hovering user input moves out of a specific area on a second area is an operation in which the hovering user input moves from the specific area in a direction extending from a first area to the second area, a touch module may maintain the selection of an object. In this case, a display module may move and display an indicator, displayed at the second area, onto a third area.

According to an embodiment of the present disclosure, a user input selecting an object may be a touch input, and the touch input may include a touch input using a user's body and a touch input using a stylus.

According to an embodiment of the present disclosure, a hovering operation of a user input may be valid within a specific height from a specific area.

Figure 11:
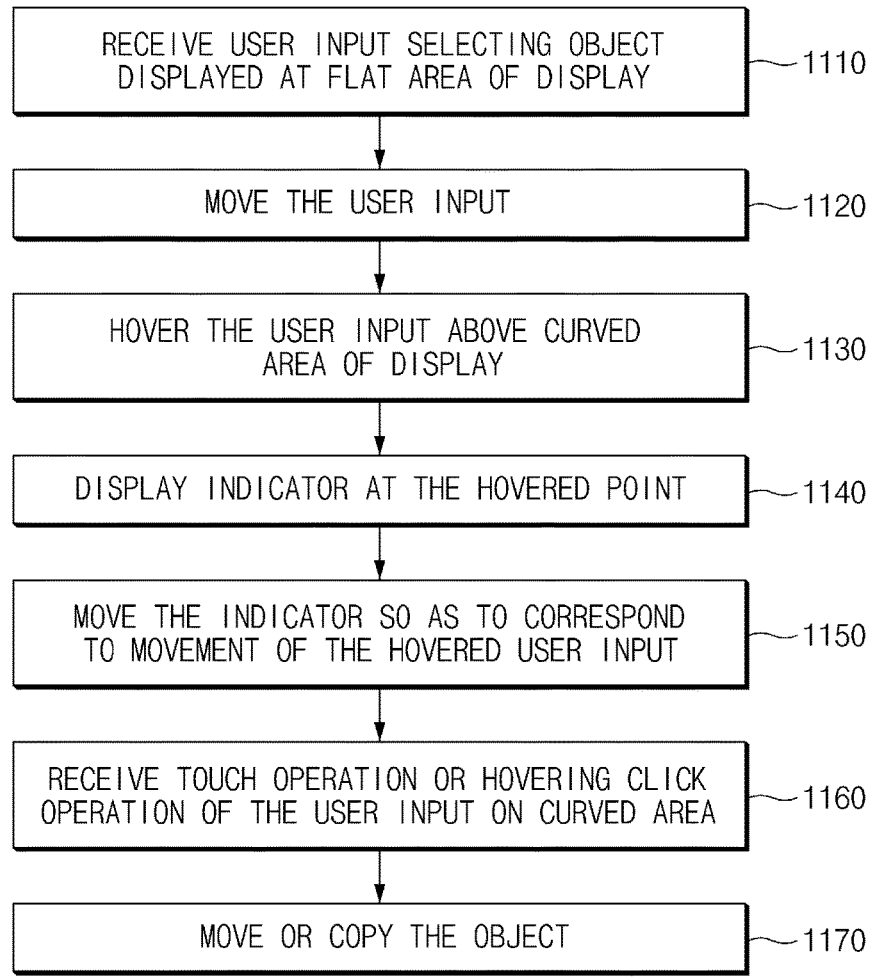
FIG. 11 is a flowchart of a method of handling a touch input at an electronic device, according to an embodiment of the present disclosure.

FIG. 11 is a flowchart of a method of handling a touch input at an electronic device, according to an embodiment of the present disclosure. A method of handling the touch input, according to an embodiment of the present disclosure illustrated in FIG. 11 may include steps processed in a time sequential manner by an electronic device according to an embodiment of the present disclosure illustrated FIGS. 1 to 10, The description above with regard to an electronic device 400 of FIGS. 1 to 10 may be applied to the method of handling the touch input according to an embodiment of the present disclosure illustrated in FIG. 11.

Referring to FIG. 11, in step 1110, the electronic device 400 may receive a user input which selects an object displayed at a flat area of a first display area 412 of a display, for example, an application icon, an image, an e-book, music, a video, various documents and files, and the like. In this case, the user input may be a touch input.

In step 1120, the electronic device 400 may recognize that the user input received in step 1110 moves onto a flat area of the first display area 412.

In step 1130, the electronic device 400 may recognize that the user input moved in step 1120 hovers above a curved area of a second display area 414.

In step 1140, the electronic device 400 may display an indicator at a location where the user input hovers in step 1130.

If the user input hovering in step 1130 moves above the curved area of the second display area 414, in step 1150, the electronic device 400 may move the indicator displayed in step 1140 so as to correspond to the user input.

In step 1160, the electronic device 400 may receive a touch operation or a hovering click operation of the user input on the curved area of the second display area 414.

In step 1170, the electronic device 400 may move or copy the object selected in step 1110, based on the touch operation or the hovering click operation in step 1160.

A method in which an electronic device handles a hovering operation, according to an embodiment of the present disclosure may include recognizing a user input selecting an object, recognizing that the hovering operation is performed at a specific area, and determining such that a selection on the object is maintained. In this case, a display of the electronic device may include a first area at which the object is displayed and a second area adjacent to the first area.

According to an embodiment of the present disclosure, the method may further include displaying an indicator at a location at which the user input hovers.

According to an embodiment of the present disclosure, the method may further include recognizing that the hovering user input moves above a specific area; and moving and displaying the indicator so as to correspond to a movement of the hovering user input.

According to an embodiment of the present disclosure, the method may further include providing a display change on an object, overlapped with the indicator, from, among objects displayed on a second area.

According to an embodiment of the present disclosure, the method may further include recognizing a touch input or a hovering click operation of a hovering user input, on a specific area, and displaying the selected object at a location corresponding to the touch input or the hovering click operation of the hovering user input.

The term "module" used herein may represent, for example, a unit including one or more combinations of hardware, software and firmware. The term "module" may be interchangeably used with the terms "unit," "logic," "logical block," "component" and "circuit" The term "module" may indicate a minimum unit of an integrated component or may be a part thereof. The term "module" may indicate a minimum unit for performing one or more functions or a part thereof. The term "module" may indicate a device implemented mechanically or electronically. For example, the term "module" may include at least one of an application-specific IC (ASIC), a field-programmable gate array (FPGA), and a programmable-logic device (PLD) for performing some operations, which are known or will be developed.

At least a portion of an apparatus (e.g., modules or functions thereof) or a method (e.g., steps) according to an embodiment of the present disclosure may be, for example, implemented by instructions stored in a non-transitory computer-readable recording medium in the form of a program module. An instruction, when executed by one or more processors (e.g., a processor 120 of FIG. 1), may cause the one or more processors to perform a function corresponding to the instruction. The non-transitory computer-readable recording medium, for example, may be the memory 130 of FIG. 1.

A non-transitory computer-readable recording medium may include a hard disk, a magnetic media, a floppy disk, a magnetic media (e.g., a magnetic tape), an optical media (e.g., a compact disc read only memory (CD-ROM) and a digital versatile disc (DVD), a magneto-optical media (e.g., a floptical disk), and hardware devices (e.g., a ROM, a RAM, or a flash memory). Also, a program instruction may include not only mechanically generated code such as code generated by a compiler but also a high-level language code executable on a computer using an interpreter. The above hardware unit may be configured to operate via one or more software modules for performing an operation of the present disclosure, and vice versa.

A module or a program module according to an embodiment of the present disclosure may include at least one of the above elements, or a portion of the above elements may be omitted, or additional other elements may be further included. Steps performed by a module, a program module, or other elements according to an embodiment of the present disclosure may be executed sequentially, in parallel, repeatedly, or in a heuristic method. Also, a portion of steps may be executed in different sequences, omitted, or other steps may be added.

According to an embodiment of the present disclosure, in the case where a touch input starting from a flat area moves into a curved area which is inclined and is extended from the flat area, user convenience may be provided such that a touch release does not occur by mistake due to the incline.

While the present disclosure has been shown and described with reference to specific embodiments thereof, it will be understood by those skilled in the art that various changes in form and details may be made therein without departing from the scope and spirit of the present disclosure as defined by the appended claims and their equivalents.

What is claimed is:

1. An electronic device, comprising:
   a touchscreen display including a flat area and a curved area adjacent to the flat area;
   a memory configured to store instructions; and
   at least one processor configured to execute the stored instructions to:
      control the touchscreen display to display an object on the flat area;
      sense a touch input selecting the object via the touchscreen display;
      sense a movement of the touch input toward the curved area;
      maintain the selection of the object during the movement of the touch input;
      sense a hovering of the touch input above a pre-defined area including the curved area and a portion of the flat area; and
      maintain the selection of the object during the hovering of the touch input,
   wherein the portion of the flat area is an area adjacent to the curved area.

2. The electronic device of claim 1,
   wherein the at least one processor is further configured to control the touchscreen display to display an indicator at a location at which the touch input hovers.

3. The electronic device of claim 2, wherein the indicator is a pointer or the selected object.

4. The electronic device of claim 2, wherein the at least one processor is further configured to control the touchscreen display to display a movement of the indicator corresponding to the movement of the hovering of the touch input.

5. The electronic device of claim 4, wherein the at least one processor is further configured to recognize an operation in which the hovering of the touch input moves out of the pre-defined area and release the selection of the object based on the operation in which the hovering of the touch input moves out of the pre-defined area.

6. The electronic device of claim 4, wherein the at least one processor is further configured to recognize an operation in which the hovering of the touch input moves out of a hovering-possible height above the pre-defined area and release the selection of the object based on the operation in which the hovering of the touch input moves out of the hovering-possible height.

7. The electronic device of claim 4, further comprising:
   wherein the at least one processor is further configured to control the touchscreen display to provide a display effect on an object, overlapped with the indicator, from among objects displayed on the curved area.

8. The electronic device of claim 7, wherein the display effect on the overlapped object comprises a change in a scale of the overlapped object, a change in a color of the overlapped object, or an animation effect on the overlapped object.

9. The electronic device of claim 2, wherein the at least one processor is further configured to recognize a re-touch input of the hovering of the touch input or a hovering click operation of the hovering of the touch input, on the pre-defined area, and
   to control the touchscreen display to display the selected object at a location corresponding to the re-touch input or the hovering click operation.

10. The electronic device of claim 1, wherein the touchscreen display further comprises
    an additional curved area adjacent to the flat area on a side opposite from the side of the flat area from which the curved area extends.

11. The electronic device of claim 10, wherein if an operation in which the hovering of the touch input moves from the pre-defined area in a direction in which the curved area extends, the at least one processor is further configured to maintain the selection of the object.

12. The electronic device of claim 11, wherein the at least one processor is further configured to control the touchscreen display to display an indicator on the additional curved area, when the hovering of the touch input moves in the direction in which the curved area extends, to where the curved area ends, the indicator indicating where the object is now located in the additional curved area.

13. The electronic device of claim 1, wherein the hovering of the touch input is valid within a pre-defined height from the pre-defined area.

14. A method in which an electronic device having a touchscreen display including a flat area and a curved area adjacent to the flat area handles a hovering operation, the method comprising:
    displaying an object on the flat area;
    sensing a touch input selecting the object via the touchscreen display;
    sensing a movement of the touch input toward the curved area;
    maintaining the selection of the object during the movement of the touch input;
    sensing a hovering of the touch input above a pre-defined area including the curved area, and a portion of the flat area; and
    maintaining the selection of the object during the hovering of the touch input,
    wherein the portion of the flat area is an area adjacent to the curved area.

15. The method of claim 14, further comprising:
    displaying an indicator at a location at which the touch input is hovering.

16. The method of claim 15, further comprising:
    displaying a movement of the indicator corresponding to the movement of the hovering of the touch input.

17. The method of claim 16, further comprising:
providing a display effect on an object, overlapped with the indicator, from among objects displayed on the curved area.

18. The method of claim 17, further comprising:
recognizing a re-touch input of the hovering of the touch input or a hovering click operation of the hovering of the touch input, on the pre-defined area, and
displaying the selected object at a location corresponding to the re-touch input or the hovering click operation.

* * * * *